United States Patent
Wang et al.

(10) Patent No.: US 10,613,640 B2
(45) Date of Patent: Apr. 7, 2020

(54) OPTICAL KEYBOARDS

(71) Applicant: Apple Inc., Cupertino, CA (US)

(72) Inventors: Paul X. Wang, Cupertino, CA (US);
Daniel J. Drusch, Sunnyvale, CA (US);
Chang Zhang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/529,638

(22) Filed: Aug. 1, 2019

(65) Prior Publication Data

US 2019/0354196 A1    Nov. 21, 2019

Related U.S. Application Data

(63) Continuation of application No. 15/426,002, filed on Feb. 6, 2017, now Pat. No. 10,394,341.

(60) Provisional application No. 62/396,763, filed on Sep. 19, 2016.

(51) Int. Cl.
*G06F 3/02* (2006.01)
*G06F 3/03* (2006.01)

(52) U.S. Cl.
CPC ............ *G06F 3/021* (2013.01); *G06F 3/0304* (2013.01)

(58) Field of Classification Search
CPC ...... G06F 3/021; G06F 3/0304; G06F 3/0202; H01H 13/00
See application file for complete search history.

(56) References Cited

U.S. PATENT DOCUMENTS

| | | | | |
|---|---|---|---|---|
| 3,526,775 A | * | 9/1970 | Friedrich | H03K 17/941 250/221 |
| 4,095,066 A | * | 6/1978 | Harris | H01H 21/22 200/458 |
| 5,034,602 A | * | 7/1991 | Garcia, Jr. | H03K 17/968 250/227.22 |
| 5,355,148 A | * | 10/1994 | Anderson | G06F 1/1616 341/31 |
| 5,384,459 A | * | 1/1995 | Patino | H01H 13/70 200/314 |
| 5,621,207 A | * | 4/1997 | O'Mara | G05G 9/047 250/221 |
| 6,369,800 B1 | * | 4/2002 | Nading | G06F 3/0202 200/314 |
| 6,705,783 B1 | | 3/2004 | Bowen | |

(Continued)

FOREIGN PATENT DOCUMENTS

| GB | 2406944 | 4/2005 |
|---|---|---|
| WO | WO 86/03862 | 7/1986 |

*Primary Examiner* — Christopher E Leiby

(74) *Attorney, Agent, or Firm* — Morgan, Lewis & Bockius LLP

(57) ABSTRACT

Aspects of the subject technology relate to electronic devices with input devices. An input device may include a button or a key of a keyboard that uses a light sensor to detect key press events. The light sensor may detect changes in an amount of received light caused by actuation of a keycap of the button or key. The button or key may include an opaque structure that blocks a portion of the light when the key is compressed. The button or key may include a light source such as a light-emitting diode that generates light. A portion of the light from the light source may illuminate the key or button to provide backlight for the key and another portion may be received by the light sensor for detecting partial or complete compression of the button or key.

20 Claims, 11 Drawing Sheets

(56) References Cited

U.S. PATENT DOCUMENTS

| | | | | |
|---|---|---|---|---|
| 7,452,107 B2* | 11/2008 | Eckert | ............... | G05G 9/047 |
| | | | | 250/221 |
| 8,766,920 B2 | 7/2014 | Wang et al. | | |
| 9,213,416 B2* | 12/2015 | Chen | ............... | G06F 3/0202 |
| 2011/0268487 A1* | 11/2011 | Larsen | ............... | G06F 3/0202 |
| | | | | 400/490 |
| 2011/0273700 A1* | 11/2011 | Lambert | ............ | G05G 9/04796 |
| | | | | 356/28 |
| 2012/0068934 A1* | 3/2012 | Larsen | ............... | G06F 3/0202 |
| | | | | 345/168 |
| 2014/0118264 A1* | 5/2014 | Leong | ............... | G06F 3/0202 |
| | | | | 345/168 |
| 2014/0252881 A1 | 9/2014 | Dinh | | |
| 2014/0346025 A1* | 11/2014 | Hendren | ............ | H01H 13/14 |
| | | | | 200/513 |

\* cited by examiner

OPTICAL KEYBOARDS

CROSS REFERENCE TO RELATED APPLICATIONS

The present application is a continuation of U.S. patent application Ser. No. 15/426,002 filed on Feb. 6, 2017, which claims the benefit of priority under 35 U.S.C. § 119 as a non-provisional of U.S. Provisional Patent Application Ser. No. 62/396,763 entitled "OPTICAL KEYBOARDS" and filed on Sep. 19, 2016, the disclosures of which are hereby incorporated by reference in their entirety for all purposes.

TECHNICAL FIELD

The present description relates generally to electronic devices, and more particularly, but not exclusively, to electronic devices with keyboards having keys with light sensors.

BACKGROUND

Electronic devices such as computers, media players, cellular telephones, set-top boxes, and other electronic equipment are often provided with input devices. Input devices can include keyboards, touchpads, mice, or touchscreens that enable a user to interact with the electronic device. Input devices can be integrated into an electronic device or can stand alone as discrete devices that can transmit signals to the electronic device via a wired or wireless connection.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
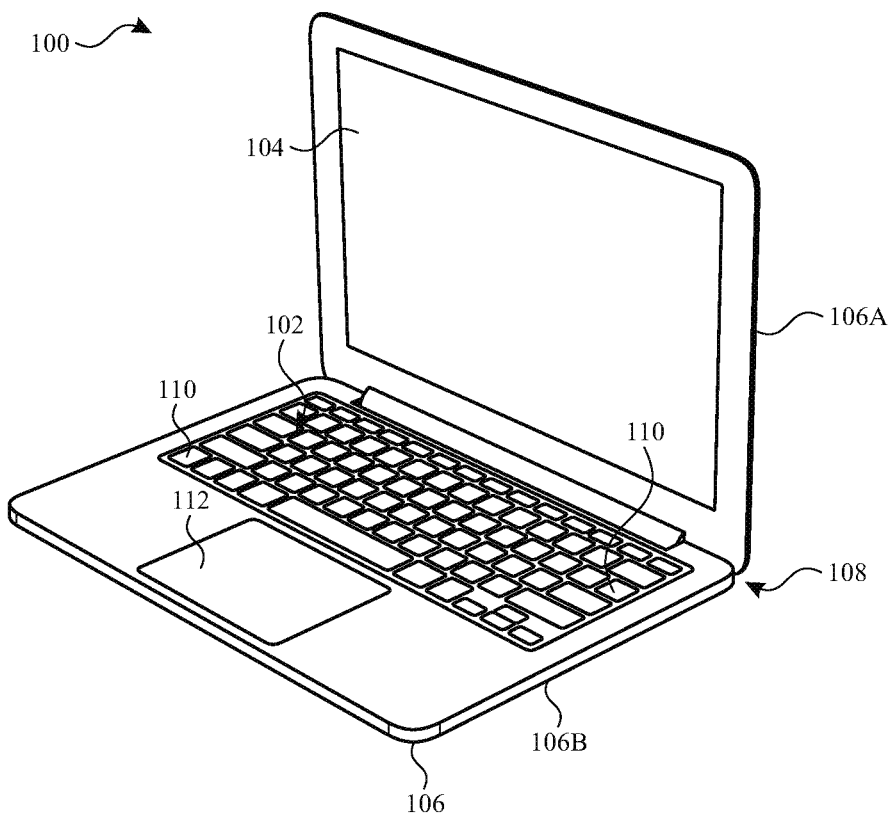
FIG. 1 illustrates a perspective view of an example electronic device implemented as a portable computer having a keyboard in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides electronic devices such as cellular telephones, media players, computers, set-top boxes, wireless access points, and other electronic equipment that may include input components. Input components may include one or more keys that are compressible by a user to gather user input data. An electronic device may include an integrated key or keyboard having an array of keys. In some implementations a separate keyboard may be provided that communicates input signals, based on key compressions or key press events, to a remote electronic device via a wired or wireless connection.

A key such as a keyboard key of a keyboard can include a keycap that actuates, in response to a pressure from a user, to compress a dome disposed under the keycap. In some implementations, compressing the dome may cause the dome to buckle, thereby allowing an electrical contact on the dome to complete an electrical circuit disposed, for example, on a printed circuit board under the dome. However, this type of electrical circuit completion, sometimes referred to as an electrical make, caused by the buckling of a dome can be difficult to coordinate with the physical feeling of buckling so that the user experiences the electronic effect of the key in coordination with the feeling of key compression.

In accordance with some aspects of the present disclosure, a key such as an electronic input key of a keyboard may be provided with a keycap and a light sensor that detects changes in an amount of received light caused by a motion of the keycap when a user presses the key. The amount of received light may be used to determine one or more key input functions of the key. The key may also include a light source that provides the light sensed by the light sensor. The light source may also provide a backlighting function for the key to illuminate one or more portions of the key for a user. A key having a light sensor may provide improved coordination of the electronic effect of the key with the physical feeling of key compression for the user, may facilitate additional key functionality in comparison with a key based on an electrical make, and/or may facilitate other functional and/or aesthetic benefits in comparison with a key based on an electrical make.

An illustrative electronic device of the type that may be provided with an input device such as a key having a light sensor is shown in FIG. 1. In the example of FIG. 1, device 100 has been implemented in the form of a portable computer. As shown in FIG. 1, device 100 may include keyboard 102, display 104, housing 106, and a touch pad such as touch pad 112.

Keyboard 102 may include one or more electronic input keys such as keys 110 that are compressible by the user to provide user input to device 100. Keys 110 may be electronically coupled to internal processing circuitry (not shown) that receives input signals from each key when the key is pressed and generates a suitable response to the key press. Suitable responses to a key press may include execution of various key function inputs such as displaying a letter or other symbol corresponding to the pressed key on display 104, changing the brightness of display 104, changing a volume of one or more speakers (not shown) of device 100, or otherwise controlling one or more features of device 100 such as a software application running on the processing circuitry of device 100.

Keys 110 may provide on/off switch-type signals when pressed and/or may provide force signals that indicate the amount of force applied to the pressed key based on a partial compression of the key.

Housing 106, which may sometimes be referred to as a case, may be formed of plastic, glass, ceramics, fiber composites, metal (e.g., stainless steel, aluminum, etc.), other suitable materials, or a combination of any two or more of these materials. Housing 106 may be formed using a unibody configuration in which some or all of housing 106 is machined or molded as a single structure or may be formed using multiple structures (e.g., an internal frame structure, one or more structures that form exterior housing surfaces, etc.). As shown in FIG. 1, housing 106 may have multiple parts. For example, housing 106 may have upper portion 106A and lower portion 106B. Upper portion 106A may be coupled to lower portion 106B using a hinge that allows portion 106A to rotate about rotational axis 108 relative to portion 106B. Keyboard 102 and touch pad 112 may be mounted in lower housing portion 106B, in some implementations.

Display 104 may be a touch screen that incorporates capacitive touch electrodes or other touch sensor components or may be a display that is not touch-sensitive. Display 104 may include display pixels formed from light-emitting diodes (LEDs), organic light-emitting diodes (OLEDs), plasma cells, electrophoretic display elements, electrowetting display elements, liquid crystal display (LCD) components, or other suitable display pixel structures. Although not shown in FIG. 1, display 104 may have openings (e.g., openings in the inactive or active portions of display 104) such as an opening to accommodate a button. A button formed in an opening in display 104 may include a light sensor and a light source implemented similarly to those described herein with respect to keys 110 in some implementations. Touch pad 112 may include an actuatable top member and a light sensor and a light source implemented similarly to those described herein with respect to keys 110 for detecting motion of the actuatable top member in some implementations.

The configuration of electronic device 100 of FIG. 1 is merely illustrative. In other implementations, electronic device 100 may be a computer such as a computer that is integrated into a display such as a computer monitor, a laptop computer, a tablet computer, a somewhat smaller portable device such as a wrist-watch device, pendant device, or other wearable or miniature device, a media player, a gaming device, a navigation device, a computer monitor, a television, or other electronic equipment. In various configurations, input keys for device 100 may be integrated with device 100 or may be formed in a separate keyboard that is coupled to device 100 via a wired or wireless (e.g., Bluetooth) connection.

Figure 2:
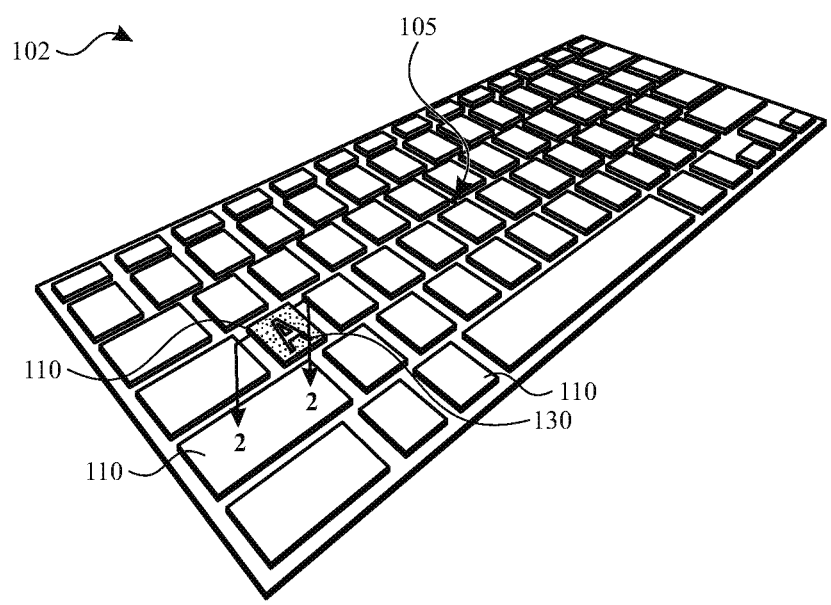
FIG. 2 illustrates a perspective view of an example keyboard in accordance with various aspects of the subject technology.

FIG. 2 is a perspective view of an exemplary keyboard 102 for use with an electronic device. In various implementations, keyboard 102 may be a peripheral component of a desktop computing system or may be an integral portion of a computing system such as a kiosk, a teller machine, a payment device, a gaming controller, or a laptop computing system as illustrated in FIG. 1. In various implementations, keyboard 102 may have a greater number of keys 110, or a fewer number of keys 110 than illustrated in FIGS. 1 and 2.

For example, in some implementations, keyboard 102 may have one, two, three, four, or more than four keys. For example, keyboard 102 may include a single key configured as button for a tablet or a smart phone or configured as a doorbell for a structure such as a house. In other implementations, keyboard 102 may include an array of keys 110 corresponding to a QWERTY keyboard as shown and one or more additional arrays of keys 110 such as an array of number keys and/or one or more arrays of dedicated function keys such as arrow keys, volume keys, display brightness keys, or other function keys such as "F" keys, or the like. Some or all of keys 110 may include a glyph 130 that that indicates the function of that key. As illustrated in FIG. 2, keyboard 102 may include keys 110 of varying sizes and positioned at various locations.

Keyboard 102 includes one or more light sources such as light source 105 (e.g., a visible-light and/or infrared light source such as a light-emitting diode). Light sources such as light source 105 are disposed at least partially within keyboard 102 so that light from the light sources travels within at least a portion each key 110. As described in further detail hereinafter, each key 110 may include a light sensor that detects light emitted by light sources such as a central light source 105 or a light source within each key or group of keys.

Figure 3:
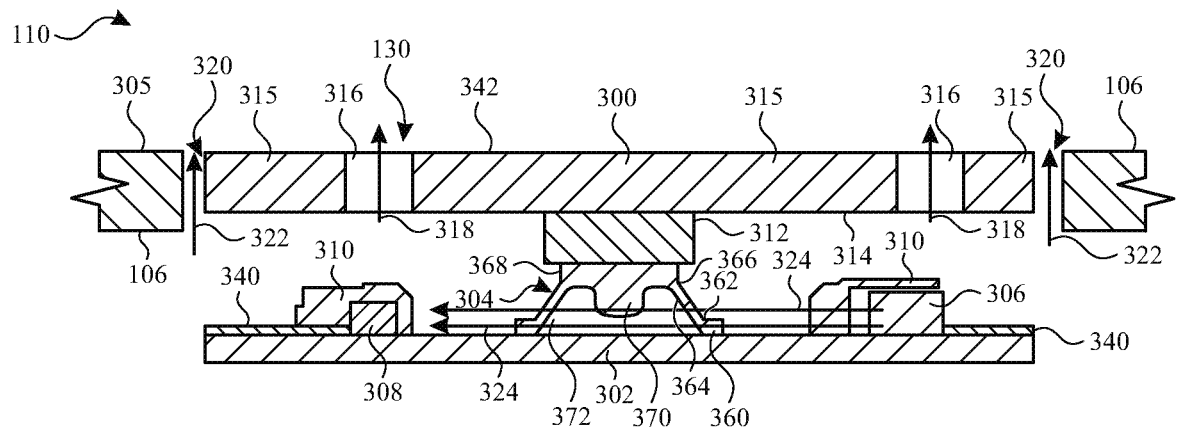
FIG. 3 illustrates a cross-sectional side view of an example key in accordance with various aspects of the subject technology.

FIG. 3 shows a cross-sectional side view, taken along line 2-2 of FIG. 2, of one of keys 110 in accordance with various aspects of the present disclosure. As shown in FIG. 3, key 110 may include an actuatable member such as keycap 300 disposed in an opening in housing 106 and additional components disposed below keycap 300 within housing 106. The additional components may include dome 304, light source 306, and light sensor 308. As shown in FIG. 3, light source 306 and light sensor 308 may each be disposed on support structure 302 and may be spaced apart from dome 304 along support structure 302. Light source 306 and light sensor 308 may be disposed on opposing sides of dome 304 such that at least a portion of dome 304 that is at least partially transparent is interposed between light source 306 and light sensor 308. Dome 304 may be interposed between support structure 302 and keycap 300 and may resiliently support keycap 300 (e.g., via direct contact support or via resilient support to a shim such as shim 312 having a first side coupled to keycap 300 and an opposing second side coupled to dome 304).

In the example of FIG. 3, dome 304 biases opaque shim 312 and keycap 300 in an uncompressed position and is configured to deform and/or compress, responsive to a compressive force applied to keycap 300, to allow opaque shim 312, a portion of dome 304, and/or another moving structure within the key to block and/or redirect some or all of the light emitted by light source 306 from reaching light sensor 308. For example, dome 304 may include a foot portion 360, a leg portion 364, a top portion 368 and, if desired, a nub 370.

Foot portion 360 may form a base for dome 304, the foot portion being attached (e.g., adhesively attached) to support structure 302. Foot portion 360 may be separated from leg portion 364 by a transition location 362 at which the angle of the exterior surface of dome 304 changes relative to the top (e.g., planar) surface of support structure 302. For example, foot portion 360 may extend in a direction parallel to the top surface of support structure 302 and leg portion 364 may extend from foot portion 360 at a non-parallel and non-perpendicular angle with respect to the top surface of support structure 302 and/or with respect to foot portion 360. Leg portion 364 may be separated from top portion 368 by a second transition location 366 at which the angle of the exterior surface of dome 304 changes relative to the top (e.g., planar) surface of support structure 302 and/or with respect to the outer surface of leg portion 364.

As discussed in further detail hereinafter, one or more portions of dome 304 may be transparent to the light emitted by light source 306 and one or more additional portions of dome 304 may be opaque to the light emitted by light source 306. It should be appreciated that, in some implementations, dome 304 may be provided without a foot portion and/or without a top portion such that the base of leg portion 364 attaches to support structure 302 directly and a top surface of leg portion 364 attaches directly to shim 312 or to keycap 300. It should also be appreciated that the cross-sectional views of leg portion 364 in FIG. 3 may represent portions of a contiguous (e.g., frustoconical) section of dome 304 or may represent discrete legs that extend between foot portion 360 and top portion 364.

Leg portion 364 may be configured to deform and/or bend until a buckling force is applied to the keycap that causes leg portion 364 to buckle in one or more locations to provide tactile feedback to the user. The buckling of leg portion 364 is coordinated with the electronic function of the key by coordinating the buckling of leg portion 364 with a known change in the amount of light received by light sensor 308 at the time of the buckle. For example, when leg portion 364 buckles, nub 370 and/or shim 312 may move rapidly to completely block the light from light source 306 to light sensor 308 (or to allow a minimum amount of light to the light sensor). The amount of light received by the light sensor before, during, and/or after the buckling of dome 304 may be calibrated (e.g., the absolute amount of light, the relative amount of light, and/or the rate of change of the amount of light may be calibrated with the buckle) so that the electronic function of the key can be provided at the time of the buckle.

In various implementations, each key 110 of keyboard 102 may include an associated light sensor and an associated keycap, the position of which can be detected and monitored based on the amount of received light at the associated light sensor as the associated keycap is actuated. One or more key function inputs for each key can thus be defined to correspond to one or more positions of the keycap or other key structure under compression of the key during a key press event. The key function inputs can also be precisely coordinated with the physical feeling of the key press based on the knowledge of the position of the keycap. A key function input can include a letter input from a letter key (e.g., an upper case or lowercase letter input), a number input from a number key, a symbol input from a symbol key, a volume control input, a brightness control input, a display color control input, a gaming control input, or other functional input provided by a user for controlling one or more features of an electronic device.

Light source 306 and light sensor 308 may be disposed on a support structure 302 that runs substantially parallel to the top surface 305 of housing 106. Support structure 302 may, for example, be a portion of a printed circuit board that includes conductive traces 340 formed thereon and/or therewithin that provide power and control signals to light source 306 and that conduct light sensor signals from light sensor 308 (e.g., to central processing circuitry of device 100).

Light sensor 308 may, for example, be a photodiode or phototransistor or other suitable visible light sensor and/or infrared light sensor configured to monitor an amount of light received during operation of keyboard 102. For example, the amount of light received by light sensor 308 may change due to changes in the position of keycap 300 and/or other structures of key 110. Light source 306 may be configured to generate light 324. Light 324 may include visible light such as white light, colored light (e.g., red light, blue light, green light) and/or non-visible light such as infrared light. For example, in one implementation, light source 306 is a white light-emitting diode that emits substantially white light. However, this is merely illustrative. In other implementations, light source 306 may emit other colors of visible light and/or infrared (IR) light in addition to, or instead of, white light to be detected by sensor 308.

Dome 304 may be disposed on support structure 302 and shaped and arranged to provide a biasing force to keycap 300 to hold keycap 300 in an uncompressed position relative to support structure 302 as shown in FIG. 3. For example, a bottom surface of dome 304 may be attached to support structure 302 and an opposing top surface of dome 304 may be attached to shim 312 (or directly to keycap 300 in some implementations). Dome 304 may be a stationary compressible dome that is compressible to allow keycap 300 to be actuated (e.g., by a force such as a compressive force from a user's finger) toward support structure 302. In the uncompressed position shown in FIG. 3, top or outer surface 342 of keycap 300 is formed in a common plane with the top surface 305 of housing 106. However, this is merely illustrative. In other implementations, in an uncompressed position, top surface 342 of keycap 300 may be disposed above or below the plane formed by top surface 305 of housing 106.

As shown in FIG. 3, dome 304 may be partially or completely transparent to light 324 generated by light source 306 so that, in a configuration in which light source 306 and light sensor 308 are disposed on opposing sides of dome 304, light 324 can pass to light sensor 308 through a portion of dome 304 that is at least partially transparent and that is interposed between light source 306 and light sensor 308. As shown in FIG. 3, light 324 may pass into and through the material of dome 304 at various locations (e.g., through the material that forms foot portion 360, leg portion 364, top portion 368 and/or nub 370) and may also pass into and through an interior cavity 372 within the dome.

Light 324 may additionally, or alternatively reflect, from various surfaces including inner surface 314 of keycap 300 to reach light sensor 308. Accordingly, motion of keycap 300 and/or compression of dome 304 may cause the amount of light 324 received at light sensor 308 to change. The change in received light may be calibrated to the position of keycap 300 such that changes in the amount of received light at light sensor 306 can be detected and used to determine the position of keycap 300. In this way, a partial or complete compression of key 110 can be detected and used to control one or more features of device 100 (e.g., by executing a key function input of the key by displaying a glyph associated with the compressed key on display 104 when the amount of received light falls below a threshold, increases above a threshold, or changes by a predetermined amount).

Dome 304, light source 306, light sensor 308 and shim 312 for each key 110 may be disposed within that key. For example, dome 304, light source 306, light sensor 308, and shim 312 for each key 110 may be disposed between the keycap 300 of that key and support structure 302. The volume within each key 110 may be defined to be the volume between an area defined by outer surface 342 of keycap 300 and a corresponding area projected onto a surface of support structure 302, to be the volume between an area defined by the outermost edge of opening 320 and a corresponding area projected onto a surface of support structure 302, or to be the volume between an area defined by the midlines between that key and each adjacent key and a corresponding area projected onto a surface of support structure 302.

In some implementations, key 110 may also be arranged such that a portion 322 of light 324 escapes from key 110 through a gap 320 between keycap 300 and housing 106 to illuminate the border of key 110. In some implementations, keycap 300 may include opaque portions 315 and transparent or diffuse portions 316 so that a portion 318 of light 324 escapes from key 110 through transparent or diffuse portions 316 to illuminate glyph 130. In this way, light source 306 may be used to provide backlight for key 110 in addition to providing light for monitoring for key press events, in some implementations.

Opaque portions 315 may be formed from resin, metal, plastic or other suitable materials. Transparent portions 316 may be formed, for example, from a diffuser material that fills an opening in the opaque portions in the shape of the desired glyph. Keycap 300 may include a substantially flat top surface or may have a slightly concave or convex shape so as to enhance the feel of the key when depressed by a user (as examples).

In the example of FIG. 3, an opaque shim 312 is disposed between keycap 300 and dome 304. Shim 312 may be formed as an integral extension from keycap 300, an integral extension from dome 304 or a separate shim member that is affixed (e.g., adhesively or by an ultrasonic weld) between keycap 300 and dome 304. Shim 312 may be formed from an opaque material such as an opaque plastic and/or may be coated with an opaque material such as a light-absorbing coating such as black ink.

Dome 304 may be formed from rubber, plastic, metal, or any combination thereof. Dome 304 may be substantially transparent to visible and/or IR light or may be formed from one or more materials having diffusive, reflective, polarizing and/or color filtering properties. In some implementations, the light that passes through dome 304 from light source 306 to light sensor 308 can be controlled using a dome formed from materials having diffusive, reflective, polarizing and/or color filtering properties. For example, light sensor 308 may include a polarizer that only allows light of a specific polarization to reach a sensing element of light sensor 308. Dome 304 may be formed from a polarizing material that polarizes light that passes through dome 304 to have the specific polarization detectable by light sensor 308. In this way, (i) light such as light 318 and 322 that travels along pathways within key 110 other than through dome 304 can be prevented from affecting measurements by light sensor 308 and (ii) a compression of dome 304 that prevents light 324 from passing through may prevent or reduce the amount of light received by light sensor 308 in a way that is calibrated to the position of keycap 300. In another example, light sensor 308 may include a color filter that only allows light of a specific color to reach a sensing element of light sensor 308. Dome 304 may be formed from a color filter material that allows only light of the specific color to pass through dome 304.

Key 110 may provide a tactile feedback to a user when keycap 300 is pressed by the user that is coordinated with an electronic response of the key. For example, the electronic response of the key (e.g., the key function input) may be provided when the amount of received light falls below a threshold, increases above a threshold, or changes by a predetermined amount at a known position of the keycap.

The structures of the key may provide a tactile feedback at that known position of the keycap (e.g., due to the bottoming out of dome 304 or due to a buckling of dome 304 at the known position). Because light sensor 308 can be used to determine the position of keycap 300 at any point along its travel (e.g., in contrast with electrical-make-based keys which can only determine when the key has been fully compressed to complete an electrical circuit), any desired number of key function inputs for each key can be provided for a corresponding number of keycap positions, including continuous control of a system feature based on the continuously determined position. Moreover, in some implementations any desired number of tactile feedback responses can be coordinated with the key function inputs for each key. For example, one or more features of dome 304 may cause the dome to have multiple buckling points during compression of the dome that each corresponds to a different key function input of the key.

In the example of FIG. 3, key 110 includes a dedicated light source 306 for that key. However, this is merely illustrative and light sensor 308 may be configured to detect changes in the amount of received light, caused by changes in the position of keycap 300, from a light source disposed outside of key 110 (e.g., a common light source for a group of keys or for the entire keyboard 102 such as light provided by a backlight for the keyboard or light provided by a central light source such as light source 105 of FIG. 2). For example, in configurations in which a common light source is provided for more than one key, light sensors in one or more keys that are spaced apart from a key having a light source may be configured to receive, and detect changes in, the light from the light source of that key. In configurations in which keyboard 102 is provided with a common light source for the entire keyboard, a light source such as light source 105 may be positioned centrally within the keyboard (as in the example of FIG. 2) or may be positioned at other locations within the keyboard (e.g., along an edge of the keyboard) such that light from the light source has a path to a sensor 308 for each key 110 (e.g., through the dome of that key 110), when the key is in an uncompressed position. When any key 110 is compressed, the pathway to the sensor for that key may be altered or partially or completely blocked, as described herein, such that a change in the amount of light received from the common light source at the sensor for that key changes in calibrated manner with the change in the position of the key (e.g., the keycap of the key).

As discussed in further detail hereinafter, key 110 may include other structures, not shown in FIG. 3, such as hinge structures (e.g., a butterfly hinge, a scissor hinge, etc.) that support and guide keycap 300.

Figure 4:
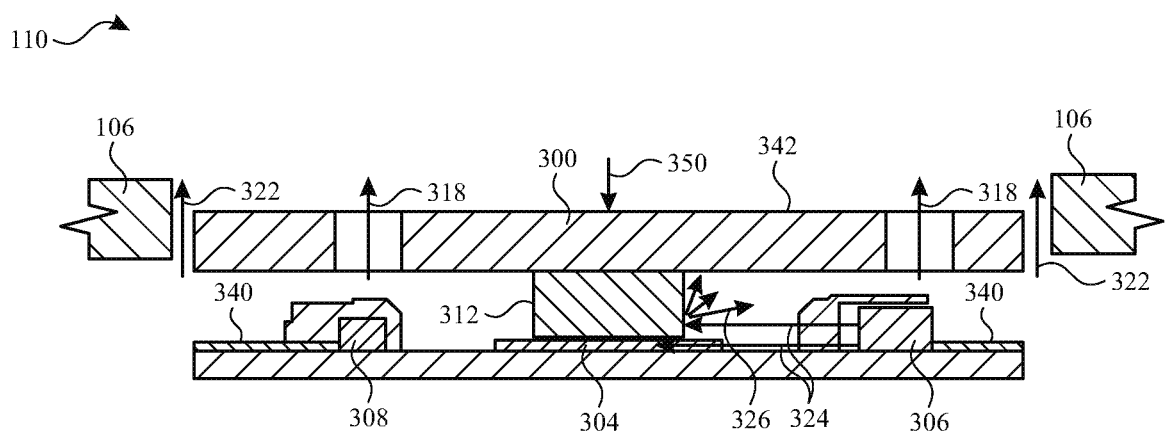
FIG. 4 illustrates a cross-sectional side view of the example key of FIG. 3 in a compressed configuration in accordance with various aspects of the subject technology.

FIG. 3 shows key 110 in an uncompressed state in which keycap 300 is biased in an uncompressed position by dome 304. As shown in FIG. 4, when a force (e.g., in direction 350) is applied on outer surface 342 (e.g., by a user's finger or other instrument of the user), keycap 400 may move in direction 350 toward structure 302 such that dome 304 is compressed to a substantially flat configuration. In the configuration of FIG. 4, keycap 300 has been fully actuated to a compressed position in which shim 312 has been moved into the path of at least some of light 324, thereby blocking that portion of light 324 from directly reaching light sensor 308. Some or all of the light 324 from light source 306 that impinges on shim 312 may be absorbed by shim 312 and/or some of the light may be redirected as reflected light 326 (e.g., light that may pass through gap 320 or portions 318 of keycap 300 for illumination of key 110).

As shown in FIG. 4, some of light 324 may continue to pass into compressed dome 304 (e.g., into the material of the dome) and may be absorbed therein or may continue to pass through to sensor 308. Accordingly, in a fully compressed position for keycap 300 and dome 304, some or all of light 324 may be blocked from reaching sensor 308. It should be appreciated that, as keycap 400 and shim 312 travel toward support structure 302 during a key press event, the amount of light blocked by shim 312 will continuously increase. Accordingly, the amount of light detected by light sensor 308 can be used to continuously determine the position of keycap 300 (and the amount of pressure applied to keycap 300) at any position between the uncompressed configuration of FIG. 3 and the compressed configuration of FIG. 4. Thus, the amount of light detected by light sensor 308 (or a change in the amount of light) can be used to determine one or more key function inputs of the key that correspond to one or more different positions of the keycap.

For example, the amount of light detected by light sensor may be used to determine that keycap 300 has been actuated to a fully compressed position, corresponding to a first key function input of the key (e.g., an input indicating that that a lowercase letter should be displayed or that a gaming character should run, fly, drive, or swim at full speed). As another example, the amount of light detected by light sensor may be used to determine that keycap 300 has been actuated to a position halfway between an uncompressed position and the fully compressed position, the halfway position corresponding to a second key function input of the key (e.g., an input indicating that that a capital letter should be displayed or that a gaming character should run, fly, drive, or swim at half speed). As another example, a halfway compression of keycap 300 may correspond to a key function input that causes two or more user-input choices to be displayed (e.g., a list of available input characters for the key such as upper case, lowercase, accented, or other language versions of a letter). The two or more user-input choices can then be selected, in one exemplary implementation, by continuing to press or releasing the keycap to another intermediate position between the uncompressed and the fully compressed position.

Because the amount of received light varies continuously with the motion of the keycap, any desired number of key function inputs may be provided for each key. For example, the speed of the gaming character can be continuously increased or decreased proportionally to the amount of actuation of the keycap. Because the amount of received light varies continuously with the motion of the keycap, the electronic effect of the key (e.g., the first and second key function inputs or the continuous adjustment of the gaming character speed) can be coordinated with the physical feeling of key compression at any position of the keycap for an improved user experience.

It should also be appreciated that, even in implementations in which no shim is provided (e.g., configurations in which keycap 300 is directly attached to dome 304) and/or dome 304 is provided without any specially designed light altering properties, the changing position of keycap 300 will cause changes in the geometry of the interior of key 110 that will change the amount of light received by light sensor 308 in a way that can be calibrated and used to continuously determine the position of keycap 300. In the examples of FIGS. 3 and 4, key 110 is provided with one light source 306 and one light sensor 308. However, this is merely illustrative. In other implementations each key 110 may be provided with more than one light source 306 and/or more than one light sensor 308. For example, for a relatively large key such as a spacebar key or an enter key of a QWERTY keyboard, two or more sensors may be provided at various positions along the length of the key and/or around the perimeter of the key to enhance detection of a key press event at any location along the key. Multiple light sensors for a key may be provided in pairs with corresponding light sources or may be configured to detect light one generated by more common light sources for the key, a group of keys, or the keyboard. In some implementations, multiple light sensors at various locations within a key can be provided to identify a tip or tilt of the key caused by pressure on the keycap at various locations to provide additional functionality for the key.

Although the example of FIG. 4 shows dome 304 compressed, in some implementations dome 304 may be formed from a substantially non-compressible material (e.g., a metal or a hard plastic) that bends, deforms, and/or buckles to allow movement of keycap 300 and to allow altering of the light received by light source 308. In other implementations, dome 304 may bend, deform, buckle and/or may also compress responsive to a pressure on keycap 300.

Figure 5:
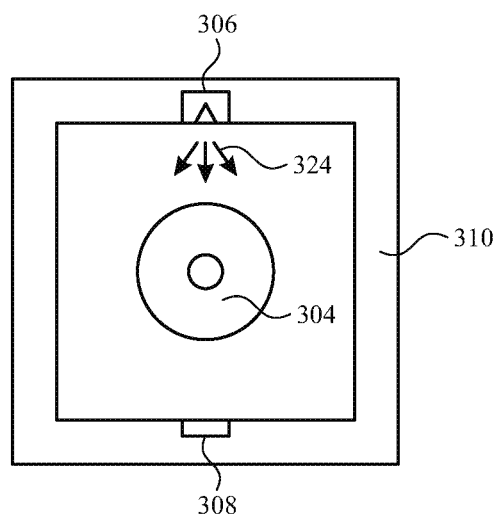
FIG. 5 illustrates a top view of an example switch housing of a key in accordance with various aspects of the subject technology.

As shown in FIGS. 3 and 4, light source 306 and light sensor 308 may be embedded within a switch housing 310. FIG. 5 shows a top view of switch housing 310 having an embedded light source 306 and an embedded light sensor 308 that detects light 324 that passes through and/or around dome 304, implemented as a dome having a circular base that is substantially surrounded by switch housing 310.

Figure 6:
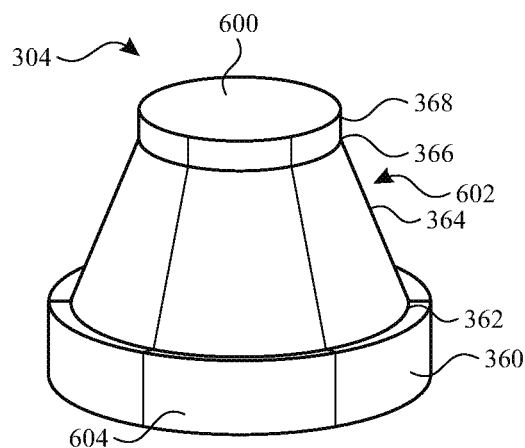
FIG. 6 illustrates a perspective view of an exemplary dome in accordance with various aspects of the subject technology.

FIG. 6 shows a perspective view of dome 304 in accordance with some aspects of the present disclosure. In the example of FIG. 6, dome 304 includes a planar top surface 600, a cylindrical portion that forms top portion 368, a frustoconical portion 602 extending from the planar top surface that forms leg portion 364, and a circumferential extension 604 around a base of frustoconical portion 602 that forms foot portion 360. Top surface 600 may be attached to shim 312 of FIGS. 3 and 4 or directly to keycap 300 in various implementations. Circumferential extension 604 may be attached to support structure 302. In the example of FIG. 6, circumferential extension 604, frustoconical portion 602, and the top cylindrical portion of dome 304 extend 360 degrees around dome 304. However, it should be appreciated that one or more openings, recesses, or discontinuities may be provided in one or more of circumferential extension 604, frustoconical portion 602, and the top cylindrical portion of dome 304 as desired to arrange the physical and optical properties of dome 304 for determining key function inputs of key 110.

Figure 7:
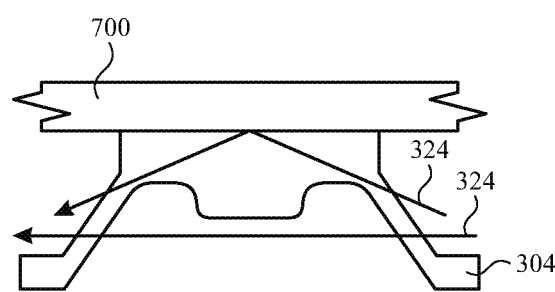
FIG. 7 illustrates a schematic diagram showing exemplary light paths within a key in accordance with various aspects of the subject technology.
Figure 8:
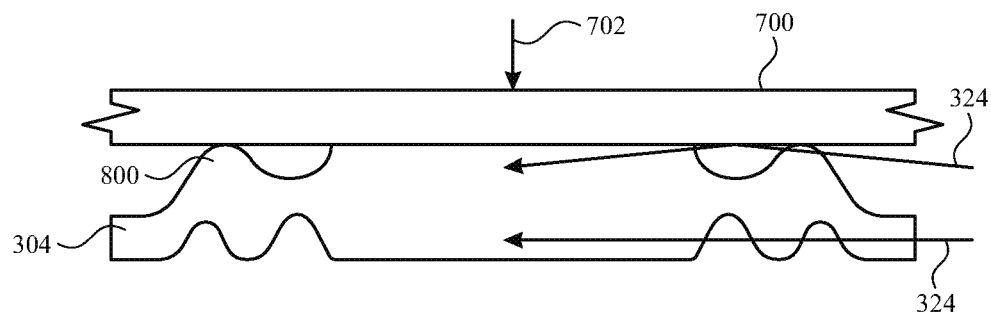
FIG. 8 illustrates a schematic diagram showing exemplary light paths within a compressed key in accordance with various aspects of the subject technology.

FIG. 7 is a cross-sectional side view of dome 304 in the configuration of FIG. 6 showing how light 324 from light source 306 may pass directly through dome 304 and/or may reflect from a surface of a structure such as structure 700 (e.g., an implementation of keycap 300 or shim 312) within and out of dome 304 in an uncompressed condition for dome 304. FIG. 8 shows the dome of FIG. 7 following compression of dome 304 due to a force in direction 702 of structure 700. As shown in FIG. 8, light that passes into dome 304 in the compressed configuration and reflects from structure 700 will reflect from structure 700 at a different angle of incidence than light reflecting from structure 700 in the uncompressed configuration of FIG. 7. Accordingly, even if some light 324 continues through dome 304 in the compressed configuration of FIG. 8, the amount of light received by a light sensor on the opposing side of dome 304 may be changed. FIG. 8 also shows how leg portion 364 of dome 304 may bend and/or buckle at a buckling location 800 to allow keycap 300 to be moved and/or to provide a tactile feedback to the user. Although a single buckling location 800 is shown, it should be appreciated that dome 304 may be arranged such that leg portion buckles two, three, or more than three times at one or more buckling locations to provide multiple tactile feedback events during compression of a key.

Figure 9:
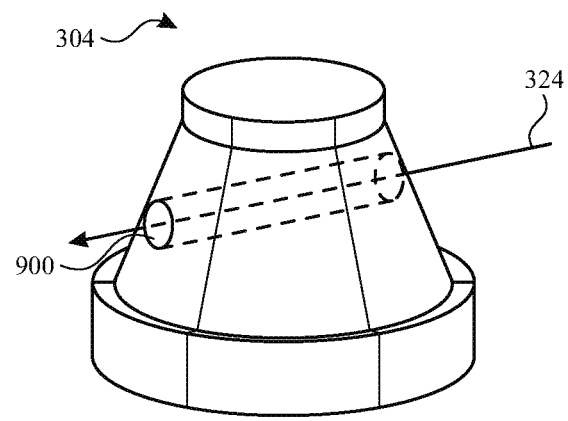
FIG. 9 illustrates a perspective view of an exemplary dome having an opening in accordance with various aspects of the subject technology.

In some implementations, dome 304 may be provided with features that facilitate or help control the passage of light through dome 304 in an uncompressed configuration. For example, as shown in FIG. 9, dome 304 may be provided, in some implementations, with one or more openings such as opening 900 through which light 324 can pass when dome 304 is uncompressed. Providing a dome with openings such as opening 900 may facilitate the use of opaque materials such as metals for forming dome 304 while still allowing light 324 to pass through when the dome is not compressed. Providing a metal dome (e.g., instead of a transparent or partially transparent rubber dome) may facilitate enhanced tactile feedback for the user that can be coordinated with the light-based electronic response of the key and/or simplified geometry for dome 304 (e.g., a dome-shaped dome) in some implementations. Providing a rubber dome may help reduce the cost and/or weight of the keyboard in some implementations.

Figure 10:
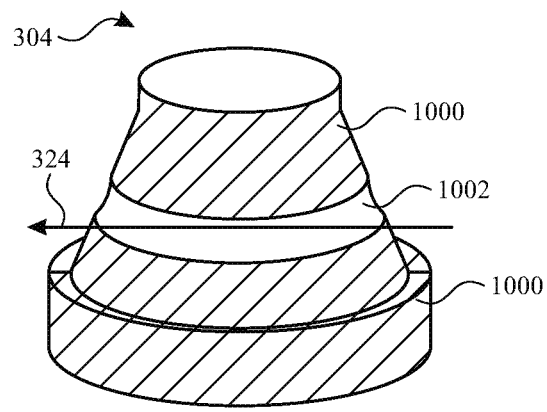
FIG. 10 illustrates a perspective view of an exemplary dome having a transparent portion and an opaque portion in accordance with various aspects of the subject technology.

As another example of a dome with features that facilitate and/or control the passage of light, FIG. 10 shows an implementation of dome 304 having opaque portions 1000 and a transparent portion 1002. For example, opaque portions 1000 may be portions of a transparent or partially transparent dome that are coated or painted with an opaque coating such as black ink to provide a painted or coated surface that helps control the amount and/or direction of light that passes through dome 304. Transparent portion 1002 may be an uncoated portion of dome 304. However this is merely illustrative. In another implementation, opaque portions 1000 and transparent portion 1002 may be formed from different (e.g., respectively opaque and transparent) materials using a two-shot or multi-shot injection molding process. It should be appreciated that the various exemplary implementations of dome 304 described in connection with FIGS. 3-10 are merely illustrative and that other implementations are contemplated. For example, multi-piece (e.g., stacked) domes, or domes with more complex shapes, may be provided that provide two or more tactile responses during compression that correspond to two or more key function inputs based on the changes in received light at the light sensor at known positions at which the tactile responses occur.

Figure 22:
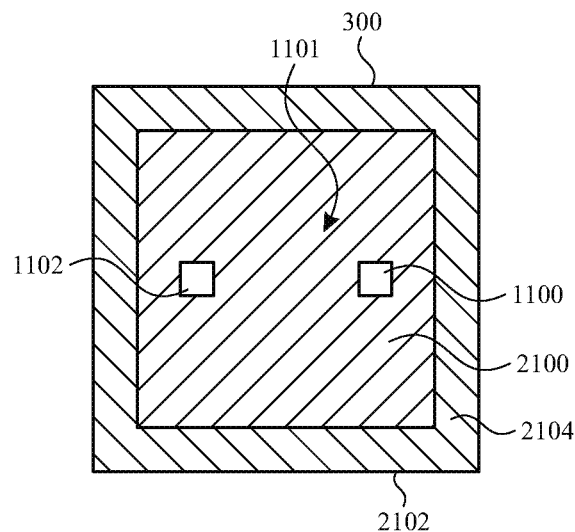
FIG. 22 illustrates a schematic bottom view diagram of another exemplary implementation of the keycap of FIG. 11 in accordance with various aspects of the subject technology.
Figure 23:
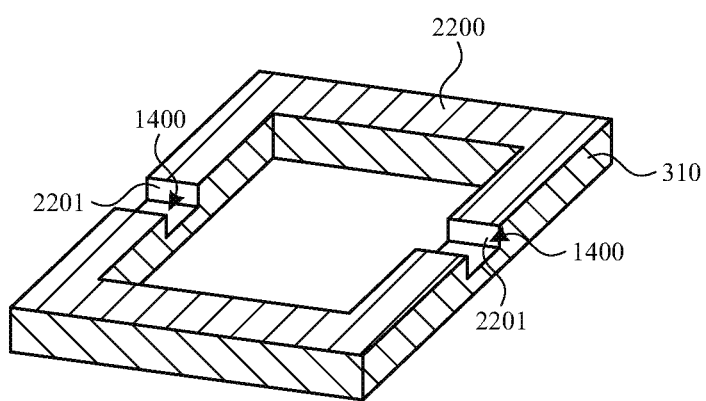
FIG. 23 illustrates a schematic perspective view diagram of the switch housing of FIG. 14 in accordance with various aspects of the subject technology.

As described above in connection with FIGS. 3-10, light emitted by light source 306 may be emitted into dome 304 and may pass through dome 304 (e.g., through the material of dome 304 or through an opening in the dome) to light sensor 308. However, it should be appreciated that dome 304 is only one example of a structure that is formed from a material that is at least partially transparent through which light from light sensor 306 may pass to reach light sensor 308. As examples (described in further detail below), FIGS. 11, 12, 21, and 22 show implementations that include a keycap that is formed from a material that is at least partially transparent through which light from light sensor 306 may pass to reach light sensor 308 and FIGS. 14, 15, and 23 show implementations that include a switch housing that is formed from a material that is at least partially transparent through which light from light sensor 306 may pass to reach light sensor 308.

Figure 11:
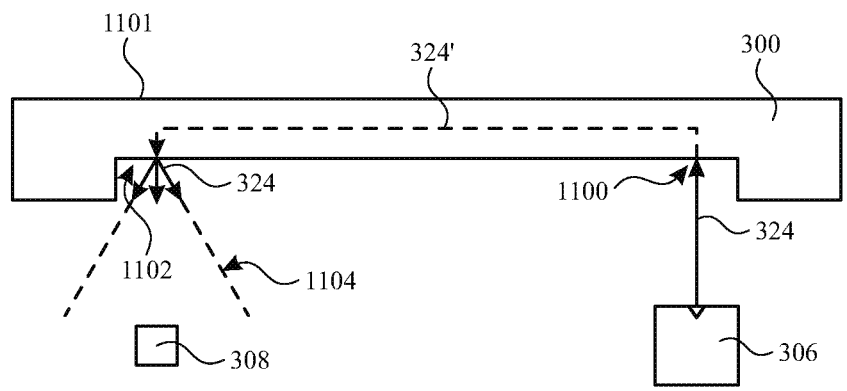
FIG. 11 illustrates a schematic cross-sectional side-view diagram of a key having a keycap with a light pipe structure in accordance with various aspects of the subject technology.
Figure 12:
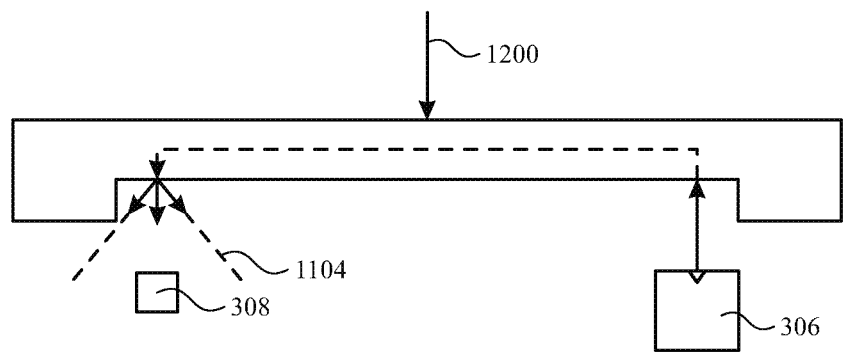
FIG. 12 illustrates a schematic cross-sectional side-view diagram of a key having a keycap with a light pipe structure with the keycap in a compressed position in accordance with various aspects of the subject technology.

In some implementations, one or more structures of key 110 may be provided with light guiding or light piping features to facilitate transfer of light from a light source of the key to a light sensor of the key for detection of key press events (e.g., by guiding light from the light source to the light sensor). For example, as shown in FIG. 11, in some implementations, light source 306 may be arranged to project light 324 in the direction of keycap 300 (e.g., in a direction away from the direction of light sensor 308 such as a direction perpendicular to a straight line between light source 306 and light sensor 308 and perpendicular to support structure 302). Light 324 may enter a light pipe portion 1101 of keycap 300 at an entrance port 1100 such that a portion 324' of light 324 is redirected and guided through keycap 300 to an exit port 1102. As shown, light 324 that exits exit port 1102 may be disbursed within key 110 in a light cone 1104 within which light sensor 308 is positioned. As keycap is actuated toward sensor 308 by a force in direction 1200 (e.g., a compressive force), as shown in FIG. 12, sensor 308 may occupy an increasingly larger fraction of light cone 1104 and the amount of light received by sensor 308 may also increase, the increase to be used for detection and monitoring of the position of keycap 300 for providing one or more key function inputs of the key in a key press event.

Figure 13:
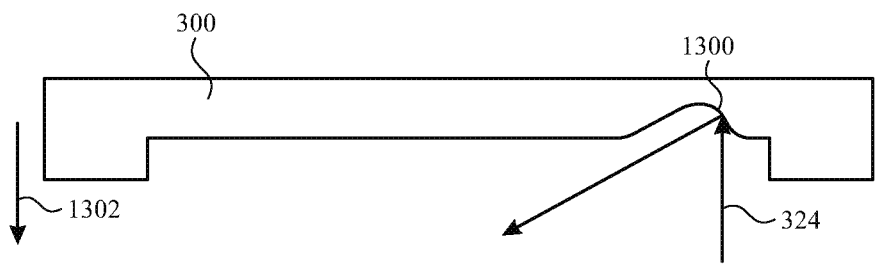
FIG. 13 illustrates a schematic cross-sectional side-view diagram of a keycap with a reflective structure in accordance with various aspects of the subject technology.

FIG. 13 shows another exemplary implementation of keycap 300 in which the keycap has a reflective structure 1300 such as a reflective notch on an internal surface of the keycap. As shown in FIG. 13, light 324 (e.g., from a vertically oriented light source as shown in FIG. 11) may reflect at a known angle (e.g., toward sensor 308 in an uncompressed position for keycap 300). As keycap 300 is actuated toward sensor 308 by a force in direction 1302, the angle of reflection may remain the same while the location of the reflector changes, thereby changing the amount of light received by light sensor 308 in a calibrated and predictable manner that can be used to detect and monitor the position of keycap 300 in a key press event. Although a single angled reflector is shown in FIG. 13, in other implementations, reflective structure 1300 may include two or more faceted reflective surfaces that more precisely control the angle of reflection toward sensor 308 at various positions along the path of travel of keycap 300.

Figure 14:
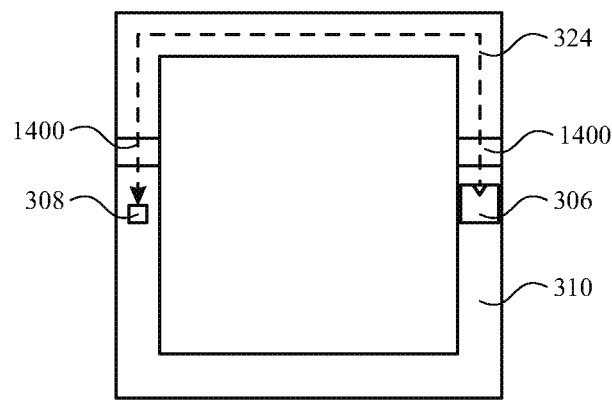
FIG. 14 illustrates a schematic top view diagram of a switch housing with a light pipe structure in accordance with various aspects of the subject technology.
Figure 15:
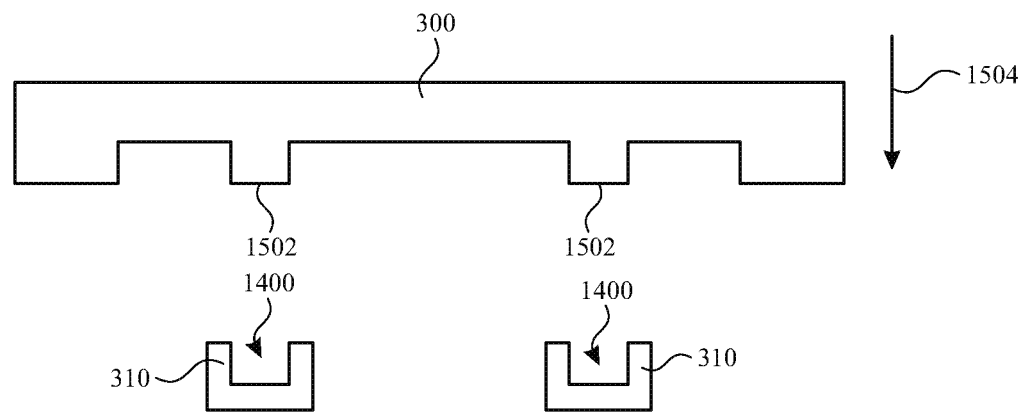
FIG. 15 illustrates a schematic cross-sectional side-view diagram of a key having a keycap and a switch housing with light-blocking features in accordance with various aspects of the subject technology.

FIG. 14 shows a top view of an exemplary switch housing for key 110 in which the switch housing is arranged as a light pipe to redirect and guide light from a light source to a light sensor. In the example of FIG. 14, light source 306 is embedded within switch housing 310 and arranged to project light 324 into the switch housing to be guided (e.g., in a direction away from the direction of light sensor 308 such as a direction perpendicular to a straight line between light source 306 and light sensor 308 and parallel to support structure 302), within the switch housing, to light sensor 308 embedded within the switch housing. As shown, switch housing 310 may include one or more openings 1400 into which one or more corresponding protrusions on an interior surface of keycap 300 can extend upon compression of key 110.

FIG. 15 is a cross-sectional side view of switch housing 310 of FIG. 14 showing how openings 1400 may include notches that are disposed opposite corresponding protrusions 1502 of keycap 300, in some implementations. In operation, keycap 300 may be pressed in direction 1504 toward switch housing 310 such that, in a compressed position, protrusions 1502 extend into openings 1400, thereby blocking light travelling within switch housing 310 from reaching light sensor 308 so that a key press event can be detected using sensor 308 and a corresponding key function input can be determined and provided.

Figure 16:
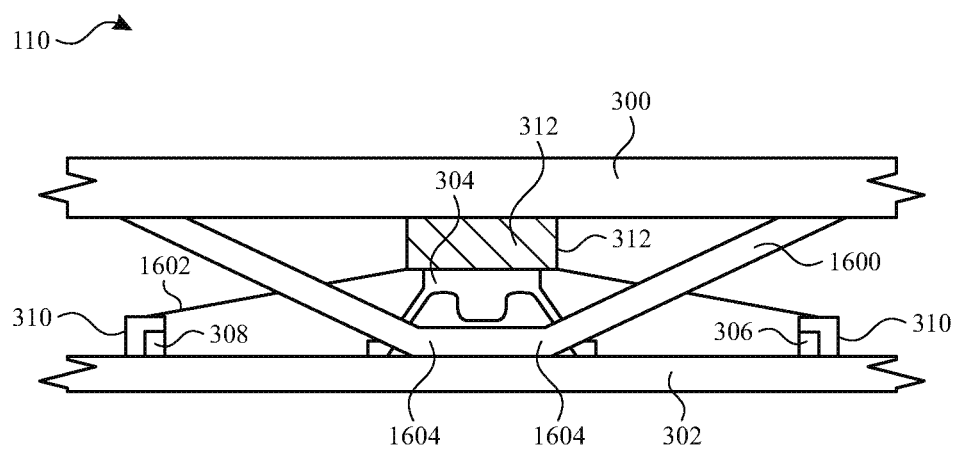
FIG. 16 illustrates a cross-sectional side view of an example key showing a motion-control feature for the key in accordance with various aspects of the subject technology.

As noted above in connection with FIGS. 3 and 4, key 110 may include additional structures. FIG. 16 illustrates a cross-sectional side view of key 110 showing exemplary structures that may be included in key 110 in addition to keycap 300, support structure 302, dome 304, light sensor 308, light source 306, and shim 312. As shown in FIG. 16, key 110 may include a hinge structure 1600. Hinge structure 1600 may be attached to support structure 302 and keycap 300 and may include portions that rotate about, for example, hinge points 1604 to provide support for keycap 300 and guide and position keycap 300 during a key press event (e.g., to distribute a load on the external surface of keycap 300 evenly over the external surface). However, the hinge structure of FIG. 16 is merely illustrative and other hinge support structures such a scissor-type hinge may be used for support and guidance of keycap 300. Also shown in FIG. 16 is a film 1602 that may be provided over dome 304 and switch housing 310 (e.g., to prevent debris, moisture, or other contaminants from obfuscating light source 306 and/or sensor 308).

Figure 17:
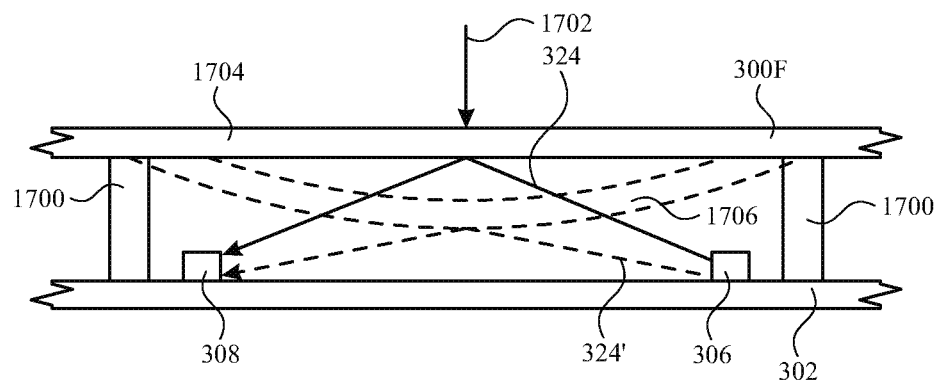
FIG. 17 illustrates a cross-sectional side view of an example key having a flexible keycap in accordance with various aspects of the subject technology.

In other implementations, keycap 300 may be a flexible keycap as shown in FIG. 17. In the example of FIG. 17, a flexible keycap 300F is provided that spans a gap between support structures 1700. Light source 306 and sensor 308 may be disposed within an enclosure formed by support structure 302, support structures 1700 and flexible keycap 300F. As shown, when a force is applied to flexible keycap 300F in direction 1702, flexible keycap 300F may deform from an undeformed configuration 1704 to a deformed configuration 1706. Deforming flexible keycap 300F may change the geometry of the enclosure such that reflected light 324' from the deformed keycap travels a different path from reflected light 324 from an undeformed keycap, thereby changing the amount of light that is received by sensor 308 in a calibrated and predictable manner that can be used to detect and monitor the position of keycap 300F and determine and provide one or more corresponding key function inputs during a key press event.

Figure 18:
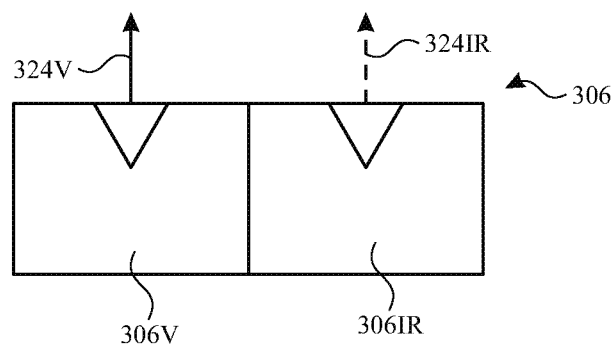
FIG. 18 illustrates a schematic diagram of a multi-band light source for a key in accordance with various aspects of the subject technology.

As noted above in connection with FIGS. 3 and 4, light source 306 may be a light-emitting diode (LED) that, in operation, emits light within a single band (e.g., a white LED that emits white light) or may be a light source that emits light in more than one band. FIG. 18 shows an exemplary implementation of light source 306 that includes two light sources in a common package. In particular, in some implementations, light source 306 may include a visible-light light source 306V and an infrared light source 306IR. Visible-light light source 306V may emit visible light 324V (e.g., white light, red light, blue light, green light, or other visible wavelength light or combination thereof) that may, for example, be used to illuminate the border of the key and a glyph of the key. IR light source 306IR may emit infrared light that is not visible by a user and that is monitored by an IR sensor implementation of light sensor 308. In this way, ambient light changes and changes in the brightness of visible-light light source 306V can be decoupled from the light and position sensing operations of light sensor 308. Although visible-light light source 306V and infrared light source 306IR are shown as being formed in a common package in FIG. 18, this is merely illustrative. In other implementations, visible-light light source 306V and infrared light source 306IR may be disposed at different locations within a key 110.

Figure 19:
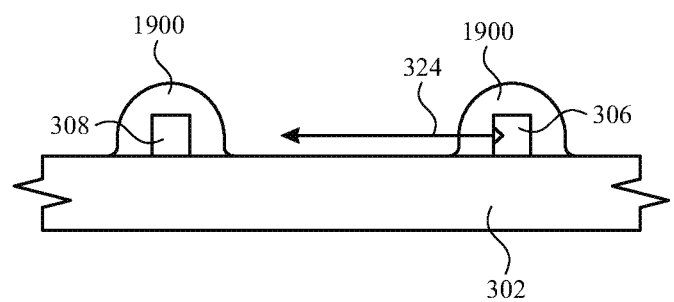
FIG. 19 illustrates a cross-sectional side view of a portion of an example key having a potted light sensor and a potted light source in accordance with various aspects of the subject technology.

Although various examples have been described herein in which a light source and/or a light sensor are embedded within a switch housing of a key, these examples are merely illustrative. In other implementations, light source 306 and light sensor 308 may be positioned separately from the switch housing and/or key 110 may be provided without a switch housing. In implementations in which light source 306 and light sensor 308 are positioned separately from the switch housing, light source 306 and light sensor 308 may be free of any enclosure or may be covered in a transparent potting material. FIG. 19 shows an example in which light source 306 and light sensor 308 are disposed on support structure 302 and covering in transparent potting material 1900 (e.g., a polyurethane or silicone potting material).

Although various examples have been described herein in which a light sensor such as light sensor 308 is used to detect and monitor the position of a keycap of an electronic key (e.g., an electronic key of a keyboard), these examples are merely illustrative. In other implementations, light sensor 308 may be used to detect a key press event (e.g., a complete or partial key press) independent of the position of the keycap (e.g., based on the position of other key structure and/or in implementations in which no keycap is provided). For example, in some implementations, key 110 may be a capless key that is operated to determine and provide a key function input, for example, when a user inserts a finger or other instrument into an opening in a keyboard housing, thereby blocking some or all of the light being received by a light sensor in the opening.

Figure 20:
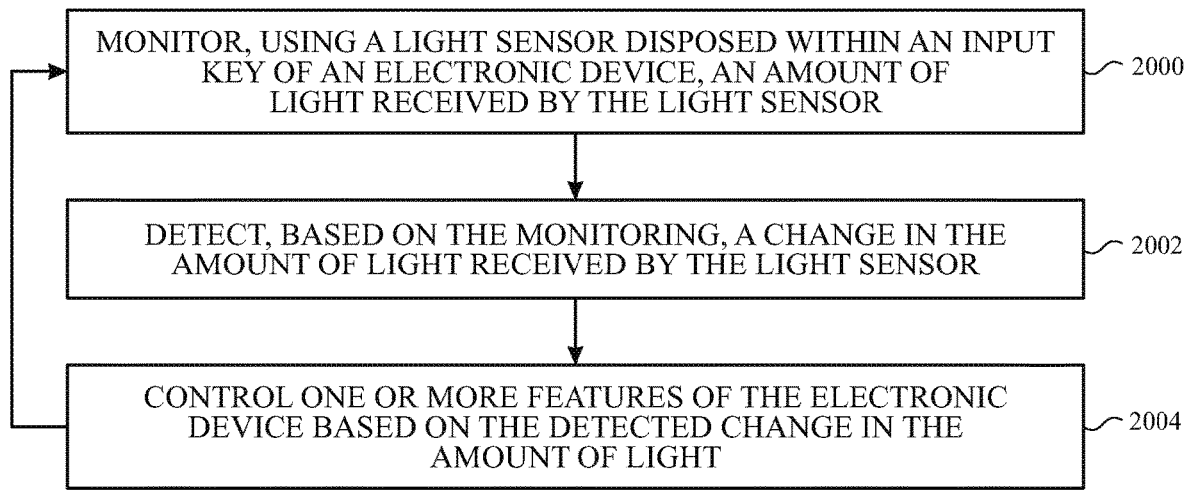
FIG. 20 illustrates a flow chart of an example process for obtaining user input with a key having a light sensor in accordance with various aspects of the subject technology.

FIG. 20 depicts a flow diagram of an example process for key function input from an electronic input key using a light sensor, according to aspects of the subject technology. For explanatory purposes, the example process of FIG. 20 is described herein with reference to the components of FIGS. 1-19. Further for explanatory purposes, the blocks of the example process of FIG. 20 are described herein as occurring in series, or linearly. However, multiple blocks of the example process of FIG. 20 may occur in parallel. In addition, the blocks of the example process of FIG. 20 need not be performed in the order shown and/or one or more of the blocks of the example process of FIG. 20 need not be performed.

In the depicted example flow diagram, at block 2900, an amount of light received by a light sensor such as light sensor 308 disposed within an input key such as key 110 of an electronic device such as device 100 may be monitored. Monitoring the amount of light may include operating the light sensor during operation of the device to monitor an amount of light received from a light source such as light source 306 disposed within the key. The received light may be received after passing through and/or reflecting from one or more structures (e.g., dome 304) within the key. The received light may be visible light and/or infrared light (as examples).

At block 2902, a change in the amount of light received by the light sensor may be detected, based on the monitoring. The change in the amount of light may be a reduction in the amount of light or an increase in the amount of light caused by actuation and/or deformation of one or more structures of the key (e.g., actuation of keycap 300 and/or deformation of dome 304) during a partial or complete key press event. The actuation and/or deformation of the one or more structures of the key may block, redirect, filter, polarize or otherwise change the flow of light within the key, thereby changing the amount of light received at the light sensor. Detecting the change in the amount of light may include detecting a change from a maximum amount of light associated with an uncompressed position of the keycap to a minimum amount of light associated with a compressed position of the keycap in the event of a complete key press event. Detecting the change in the amount of light may include detecting a change from a maximum amount of light associated with an uncompressed position of the keycap to an amount of light that is between the maximum amount of light and a minimum amount of light associated with a compressed position of the keycap, in the event of a partial key press event.

At block 2904, one or more features of the electronic device may be controlled based on a key function input corresponding to the detected change in the amount of light. For example, a glyph such as a letter associated with the key may be displayed on display 104 when a complete key press event is detected or when a change in the amount of light over a predetermined threshold is detected. Controlling the one or more features of the electronic device may include providing an electronic effect of the key (e.g., the key function input) in coordination with a tactile feedback from the key for the user (e.g., the buckling of a dome or the bottoming out of the compressed dome against a support structure of the key such as a portion of a printed circuit board). As another example, a continuously variable feature of the electronic device (e.g., a speed of motion of a gaming character, a display brightness, a display color, an audio volume, etc.) may be varied proportionally to the detected amount of compression of the key, as determined based on a calibrated relationship between the change in the amount of detected light and the position of the keycap of the key. As another example, two or more discrete key function inputs for a key may be provided that correspond to two or more different amounts of compression of the key. The two or more discrete key function inputs may be coordinated with two or more corresponding tactile feedback features of the key (e.g., by providing a dome having two or more buckling features or by providing two or more stacked domes that buckle at known amounts of compression of the key).

Figure 21:
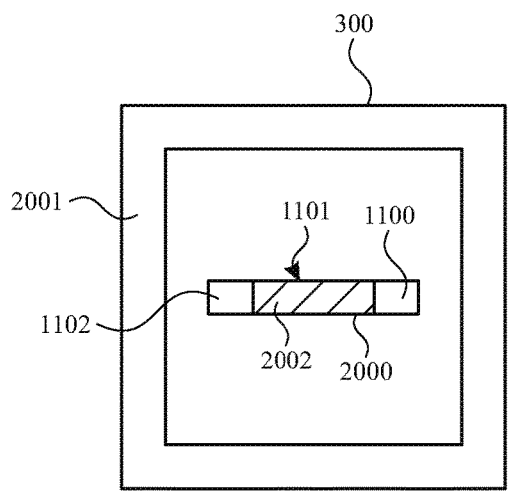
FIG. 21 illustrates a schematic bottom view diagram of an exemplary implementation of the keycap of FIG. 11 in accordance with various aspects of the subject technology.

FIG. 21 shows an exemplary implementation of keycap 300 of FIG. 11. In the example of FIG. 21, light pipe portion 1101 of keycap 300 is formed from a transparent light pipe structure 2000 embedded within keycap structure 2001 (e.g., a substantially opaque plastic, metal, or other structure that forms the keycap for key 110). For example, keycap structure 2001 and light pipe structure 2000 may be formed in a two-shot molding process. As shown in FIG. 21, light pipe structure 200 may have a painted portion 2002 that defines entrance port 1100 and exit port 1102. However, the configuration of keycap 300 in FIG. 21 is merely illustrative and other arrangements for a keycap 300 having a light pipe structure may be provided. For example, FIG. 22 shows another exemplary implementation of keycap 300 of FIG. 11 in which entrance port 1100 and exit port 1102 are formed from openings in an opaque coating 2100 in a monolithic, transparent keycap structure 2102. Opaque coating 2100 may be painted or otherwise applied to an exterior top surface (not shown), sidewall surfaces (not shown), and/or an interior bottom surface of keycap 300 such that openings defining ports 1100 and 1102 and/or other openings allow light to pass into and out of keycap 300 at desired locations (e.g., to illuminate a light sensor and/or to a border or a glyph such as glyph 130 of FIG. 2).

FIG. 23 shows an exemplary implementation of switch housing 310 of FIG. 14. As shown in FIG. 23, switch housing 310 may be a painted transparent structure having an opaque coating 2200 that prevents light from exiting switch housing 310 at locations other than desired locations (e.g., coated portions of the switch housing). For example, sidewalls 2201 of openings 1400 may be transparent (e.g., free of coating 2200) so that light from within switch housing 310 can pass out of one sidewall and into an opposing sidewall to reach a sensor 308 embedded within switch housing 310 when protrusions 1502 are not disposed within openings 1400. In other implementations, light may be guided and/or redirected through keycap 300 or switch housing 310 via total internal reflection.

Various examples of dome implementations have been described (see, e.g., the above discussion of FIGS. 9 and 10) in which dome 304 is provided with transparent and opaque portions that control the amount of light that passes through the dome in various states of compression of a key. FIGS. 24-28 illustrate implementations in which nub 370, formed within internal cavity 372 of dome 304, is opaque and leg portion 364 is transparent to the light provided by light source 306.

Figure 24:
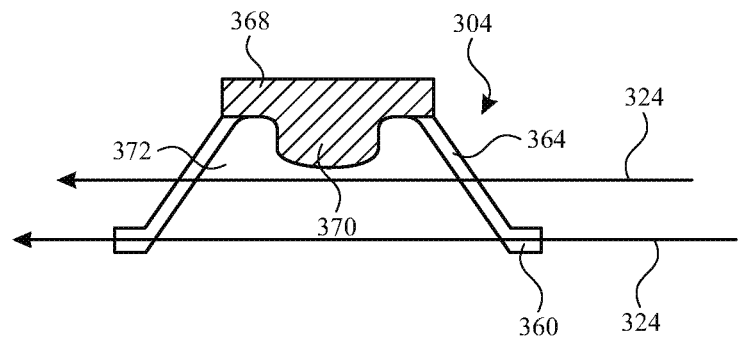
FIG. 24 illustrates a cross-sectional side view of a dome in an uncompressed position and having a transparent leg portion and an opaque top and nub portion in accordance with various aspects of the subject technology.
Figure 25:
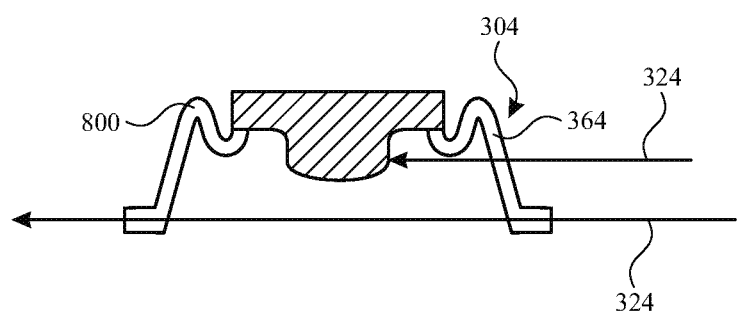
FIG. 25 illustrates the dome of FIG. 24 in a partially compressed position in accordance with various aspects of the subject technology.
Figure 26:
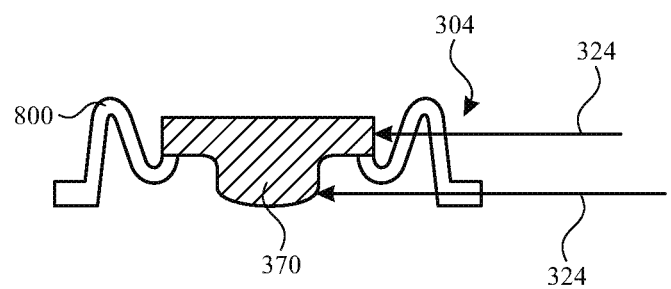
FIG. 26 illustrates the dome of FIG. 24 in a fully compressed position in accordance with various aspects of the subject technology.

In the example of FIG. 24, nub 370 and top portion 368 are opaque and leg portion 364 and foot portion 360 are transparent. As shown in FIG. 24, when dome 304 is in an uncompressed configuration, light 324 that passes through leg portion 364 and/or foot portion 360 may pass unobstructed by nub 370 and top portion 368. As shown in FIG. 25, when dome 304 is partially compressed (e.g., between an uncompressed and a fully compressed position), a portion of light 324 may continue to pass through dome 304 (e.g., through foot portion 360) while an additional portion of light 324 is blocked by opaque nub 370. In this partially compressed position, leg portion 364 has bent and/or buckled at buckling location 800, and the light received by sensor 308 has been reduced in comparison with the light received in the uncompressed position. As shown in FIG. 26, in a fully compressed position, nub 370 has been moved to block light passing through foot portion 360 and some or all of top portion 368 may block a portion of light 324 so that light received by sensor 308 is a minimum amount of light for the key.

In the example of FIGS. 24-26, nub 370 and top portion 368 are formed from an opaque material. However, this is merely illustrative. In other implementations, nub 370 and top portion 368 can be formed from a transparent material that is coated with an opaque coating (e.g., black ink or paint). For example, the exterior surface of top portion 368 may be coated with an opaque coating and the interior surface (within cavity 372) of nub 270 may be coated with an opaque coating in one implementation.

Figure 27:
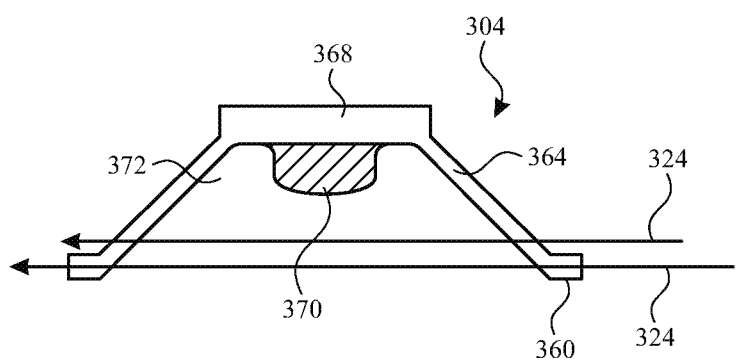
FIG. 27 illustrates a cross-sectional side view of a dome in an uncompressed position and having a transparent leg and top portion and an opaque nub portion in accordance with various aspects of the subject technology.
Figure 28:
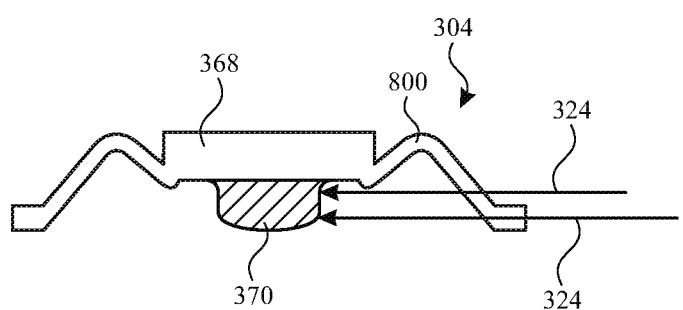
FIG. 28 illustrates the dome of FIG. 27 in a compressed position in accordance with various aspects of the subject technology.

In the example of FIGS. 24-26, both top portion 368 and nub 370 are opaque. However, as shown in FIGS. 27 and 28, in some implementations, top portion 368 may be transparent and nub 370 may be opaque. As shown in FIG. 28, nub 370 may be opaque and arranged such that, when moved from an uncompressed to a fully compressed position, nub 370 blocks an increasing amount of the light passing into dome 304 from passing through to sensor 308. Nub 370 may be integrally formed with top portion 368 or may be a separate nub member that is attached to an interior surface of top portion 368.

In accordance with various aspects of the subject disclosure, an electronic device is provided that includes a keyboard having at least one key. The at least one key may include a keycap and a light sensor configured to detect a change in an amount of received light due to motion of the keycap. The detected change in the amount of received light may determine a key function input of the at least one key.

In accordance with other aspects of the subject disclosure a keyboard is provided that includes at least one key. The at least one key may include a keycap and a light sensor configured to detect a change in an amount of received light due to motion of the keycap. The detected change in the amount of received light may determine a key function input of the at least one key.

In accordance with other aspects of the subject disclosure a method is provided that includes monitoring an amount of received light with a light sensor disposed within an electronic input key. The method may also include detecting, with the light sensor, a change in the amount of received light based on the monitoring. The method may also include controlling a feature of an electronic device based on the detected change in the amount of received light.

In accordance with other aspects of the subject disclosure, a keyboard is provided that includes a support structure and a key. The key includes a keycap. The key also includes a compressible dome disposed on the support structure and interposed between the support structure and the keycap. The compressible dome resiliently supports the keycap and includes a portion that is at least partially transparent. The key also includes a light sensor disposed on the support structure and spaced apart from the dome. The key also includes a light source disposed on the support structure and spaced apart from the dome. The portion of the dome that is at least partially transparent is interposed between the light source and the light sensor when the keycap is in an uncompressed position.

In accordance with other aspects of the subject disclosure, a keyboard is provided that includes an electronic input key. The electronic input key includes an actuatable member, a light source, a light sensor, and a structure within the key that is formed from a material that is at least partially transparent. The light source is configured to emit light into the material. The light sensor is configured to receive a portion of the light that has passed into and through the material and to detect a change in an amount of the received portion of the light caused by actuation of the actuatable member.

In accordance with other aspects of the subject disclosure, a keyboard is provided that includes a key. The key includes a keycap and a dome having at least a portion that biases the keycap in an uncompressed position and allows motion of the keycap between the uncompressed position and a fully compressed position. The key also includes a light source and a photodiode configured to receive light, emitted by the light source, that has passed through the dome and to detect a change in an amount of the received light due to the motion of the keycap. The detected change in the amount of the received light determines a key function input of the key.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology.

A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A keyboard comprising:
   a support structure; and
   a key, comprising:
   a keycap;
   a compressible dome disposed on the support structure, wherein the compressible dome is attached to the support structure and interposed between the support structure and the keycap, wherein the compressible dome resiliently supports the keycap and includes a portion that is at least partially transparent, wherein the compressible dome is configured to compress when the key is depressed by a user, wherein the keycap is moveable between an uncompressed position, an intermediate position, and a fully compressed position, the intermediate position being between the uncompressed position and the fully compressed position, the compressible dome being directly attached to the support structure via a leg portion that is configured to buckle by bending when the keycap is at the intermediate position;
   a light sensor disposed on the support structure and spaced apart from the dome; and
   a light source disposed on the support structure and spaced apart from the dome, wherein the portion of the dome that is at least partially transparent is interposed between the light source and the light sensor when the keycap is in an uncompressed position, wherein each of the uncompressed position, the intermediate position, and the fully compressed position corresponds to a different key function input of the key.

2. The keyboard of claim 1, wherein the support structure comprises a portion of a printed circuit board, wherein the key further comprises an opaque shim having a first side coupled to the keycap and an opposing second side coupled to the dome, and wherein the dome biases the opaque shim and the keycap in the uncompressed position and is compressible, responsive to a compressive force applied to the keycap, to allow the opaque shim to block light emitted by the light source from reaching the light sensor.

3. The keyboard of claim 1, wherein the dome further comprises an opaque portion.

4. The keyboard of claim 3, wherein the dome comprises a painted surface that forms the opaque portion.

5. The keyboard of claim 1, wherein the portion of the dome that is at least partially transparent comprises a polarizing material.

6. The keyboard of claim 1, wherein at least the portion of the dome that is at least partially transparent is formed from a rubber that is at least partially transparent to light emitted by the light sensor.

7. The keyboard of claim 1, wherein the compressible dome is directly attached to the support structure via a leg portion that is configured to buckle.

8. The keyboard of claim 1, wherein the dome is formed from a metal and wherein the portion of the dome that is at least partially transparent comprises an opening in the dome that allows light from the light source to pass through the dome to be received by the light sensor when the keycap is in the uncompressed position.

9. A keyboard, comprising:
   an electronic input key, comprising:
   an actuatable member;
   a light source;
   a light sensor; and
   a structure within the key that is formed from a material that is at least partially transparent, wherein the light source is configured to emit light into the material, wherein the light sensor is configured to receive a portion of the light that has passed into and through the material and to detect a change in an amount of the received portion of the light caused by actuation of the actuatable member, and wherein the structure is configured to provide multiple tactile feedback responses at multiple compressed positions of the key, each of the multiple compressed positions being different than an uncompressed position of the key, the multiple tactile feedback responses corresponding to multiple predetermined changes in the amount of the received portion of the light relative to an amount of the received portion of the light when the key is in the uncompressed position, wherein each of the predetermined changes corresponds to a different key function input of the key.

10. The keyboard of claim 9, wherein the structure comprises a dome formed from the material and wherein the key further comprises an opaque shim between the dome and the actuatable member.

11. The keyboard of claim 9, the electronic input key further comprising a dome, wherein the actuatable member comprises a keycap supported by the dome, wherein the structure comprises a light pipe in the keycap, wherein the light source is configured to emit the light into the light pipe, and wherein the light pipe is configured to redirect and guide the portion of the light through the light pipe to the light sensor.

12. The keyboard of claim 11, wherein the keycap comprises an opaque keycap structure and wherein the light pipe comprises the material and the material is embedded within the opaque keycap structure.

13. The keyboard of claim 11, wherein the keycap comprises a monolithic transparent keycap structure having an opaque coating with a first opening that defines an entrance port for the light into the transparent keycap structure and a second opening that defines an exit port for the light to the light sensor.

14. The keyboard of claim 9, wherein the structure comprises a switch housing within which the light source and the light sensor are embedded, and wherein at least a portion of the switch housing comprises a light pipe arranged to redirect and guide the light from the light source to the light sensor.

15. The keyboard of claim 14, wherein the switch housing is formed from the material and includes an opaque coating on the material that prevents light from exiting coated portions of the material.

16. The keyboard of claim 14, wherein the switch housing comprises an opening, wherein the actuatable member comprises a keycap having a protrusion, and wherein the protrusion is configured to be received into the opening to block at least a portion of the light within the switch housing, upon actuation of the keycap from an uncompressed position to a compressed position.

17. The keyboard of claim 9, wherein the structure has multiple buckling points that are each configured to buckle, wherein the multiple buckling points are configured to provide the multiple tactile feedback responses, and wherein the key is configured to provide multiple key function inputs to an electronic device upon detecting the multiple predetermined changes.

18. A keyboard, comprising:
a key, comprising:
  a keycap;
  a dome having at least a portion that biases the keycap in an uncompressed position and allows motion of the keycap between the uncompressed position and a fully compressed position, wherein the dome comprises a first surface attached to the keycap and a leg portion attached to a support structure, wherein the leg portion extends at a non-perpendicular and non-parallel angle with respect to the first surface;
  a light source; and
  a photodiode configured to receive light, emitted by the light source, and that has passed through the dome, and to detect a change in an amount of the received light due to the motion of the keycap, wherein the detected change in the amount of the received light determines a key function input of the key, wherein a location along the leg portion is configured to buckle by bending at a time between the uncompressed position and the fully compressed position, and wherein the key function input is coordinated with a predetermined change in the amount of the received light corresponding to the time of the buckle, the keyboard being configured to communicate a signal corresponding to the key function input and based on the predetermined change in the amount of the received light.

19. The keyboard of claim 18, wherein the detected change comprises a change from a maximum amount of light associated with the uncompressed position of the keycap to an amount of light that is between the maximum amount of light and a minimum amount of light associated with the fully compressed position of the keycap.

20. The keyboard of claim 18, wherein the leg portion is configured to bend at the location along the leg portion at the time of the buckle.

* * * * *